US008353363B2

(12) United States Patent
Hirt et al.

(10) Patent No.: US 8,353,363 B2
(45) Date of Patent: Jan. 15, 2013

(54) HANDHELD POWER TOOL DEVICE FOR DETECTING TORQUE

(75) Inventors: Daniel Hirt, Kirchentellinsfurt (DE); Ursula Faber, Stuttgart (DE)

(73) Assignee: Robert Bosch GmbH, Stuttgart, DE (US)

( * ) Notice: Subject to any disclaimer, the term of this patent is extended or adjusted under 35 U.S.C. 154(b) by 97 days.

(21) Appl. No.: 12/636,101

(22) Filed: Dec. 11, 2009

(65) Prior Publication Data

US 2010/0147545 A1 Jun. 17, 2010

(30) Foreign Application Priority Data

Dec. 11, 2008 (DE) ........................ 10 2008 054 508

(51) Int. Cl.
*B23Q 5/00* (2006.01)

(52) U.S. Cl. ......................... 173/182; 173/180; 173/181

(58) Field of Classification Search .................. 173/180, 173/182, 181; 73/862.21, 862.23
See application file for complete search history.

(56) References Cited

U.S. PATENT DOCUMENTS

| | | | | | |
|---|---|---|---|---|---|
| 4,273,198 | A | * | 6/1981 | Doniwa | 173/1 |
| 4,281,538 | A | * | 8/1981 | Dudek | 73/862.21 |
| 4,286,458 | A | * | 9/1981 | Alexander | 73/862.21 |
| 4,549,438 | A | * | 10/1985 | Grabovac et al. | 73/862.21 |
| 5,172,774 | A | * | 12/1992 | Melrose | 173/182 |
| 5,289,886 | A | * | 3/1994 | Shikata et al. | 173/181 |
| 2007/0012121 | A1 | | 1/2007 | Hsieh | |
| 2008/0127748 | A1 | | 6/2008 | Liao | |

FOREIGN PATENT DOCUMENTS

| | | | |
|---|---|---|---|
| EP | 1918072 | A2 | 5/2008 |
| JP | 57073644 | A | 5/1982 |
| WO | 2008090069 | A1 | 7/2008 |

* cited by examiner

*Primary Examiner* — Lindsay Low
(74) *Attorney, Agent, or Firm* — Maginot, Moore & Beck

(57) ABSTRACT

The invention is based on a device for handheld power tool for detecting a torque, having at least one sensor unit. It is proposed that the sensor unit is intended for detecting a deformation parameter. The sensor unit has at least one sensor element that is embodied as a strain gauge. A gearbox is provided which has a bearing location for receiving a deformation element of the sensor unit. An electronic unit evaluates detected data from the at least one sensor unit.

18 Claims, 4 Drawing Sheets

HANDHELD POWER TOOL DEVICE FOR DETECTING TORQUE

CROSS-REFERENCE TO RELATED APPLICATION

This application is based on German Patent Application 10 2008 054 508.2 filed Dec. 11, 2008.

BACKGROUND OF THE INVENTION

1. Field of the Invention

The invention is based on a handheld power tool device for detecting a torque, having at least one sensor unit.

2. Description of the Prior Art

Handheld power tool devices for detecting a torque have already been proposed that include a sensor unit. The sensor unit has an evaluation unit, which is intended for evaluating a current parameter of an electric motor.

ADVANTAGES AND SUMMARY OF THE INVENTION

It is proposed that the sensor unit is intended for detecting a deformation parameter. In this connection, the term "intended" should be understood in particular to mean especially equipped and/or especially designed and/or especially programmed. The term "deformation parameter" should be understood here to mean in particular a parameter of a deformation that characterizes a change in a geometric shape and/or in a dimension of an element and/or of a component, such as a change in a width and/or a height and/or especially advantageously a length of the element and/or of the component. The change in the geometric shape and/or in the dimension is caused in particular by mechanical stresses that are caused in the element and/or the component by external loads. Preferably, the change in length of the element and/or component is dependent on a torque of at least one gear component of a handheld power tool, in particular of a cordless screwdriver.

By the embodiment according to the invention of the handheld power tool device, reliable detection of torques can be attained in a structurally simple way. Advantageously, it is possible to detect torques that are independent of a current parameter of an electric motor of a handheld power tool and/or are independent of the efficiency of an overload clutch and thus are especially independent of fluctuations in a limit current of an electric motor. Moreover, by means of the sensor unit that is intended for detecting torques, a reliable torque limitation of a handheld power tool can especially advantageously be achieved. Then, components of the handheld power tool can advantageously be spared from stress.

It is furthermore proposed that the sensor unit has at least one sensor element, whose electrical resistance is dependent on a deformation. Preferably, the sensor element is intended for ascertaining and/or detecting a nonelectrical measurement signal representing the deformation parameter and converting this measurement signal for further processing into an electrical measurement signal, in particular into an electrical resistance. The sensor element may be embodied as a signal receiver and/or signal transducer and/or initiator and/or transmitter and/or detector and/or converter. However, it is conceivable for the sensor element to be embodied in some other way that appears useful to one skilled in the art. Preferably, the deformation is caused in particular by forces and/or torques that act on and/or are transmitted to the element and/or the component.

By means of the sensor element of the invention, economical and precise detection of a torque of a gear, especially a planetary gear, in a handheld power tool, especially in a cordless screwdriver, can advantageously be attained in a structurally simple way.

Preferably, the sensor unit has at least one sensor element that is embodied as a strain gauge (SG). A "strain gauge (SG)" here defines in particular an element and/or a component that is intended for ascertaining and/or detecting deformation. Preferably, the strain gauge (SG) is disposed on a surface, subject to the deformation, of an element and/or component. Depending on the type of application, it may be advantageous to combine a plurality of strain gauges (SGs) with one another, so that various types of stress can be ascertained and/or a magnitude of a stress can be ascertained. A mode of operation of the strain gauge (SG) is equivalent to a mode of operation that is already known to one skilled in the art.

Preferably, the strain gauges (SGs) are intended for ascertaining and/or detecting changes in length, such as elongations and/or compression, caused by mechanical loads in at least one direction of an element and/or component. Advantageously, even slight deformation of the element and/or component can be detected by means of the strain gauge (SG). Moreover, a precise association of a torque in a gear, in particular a planetary gear, of a handheld power tool with a deformation of the element and/or component can advantageously be attained, so that precise detection of the torque of the gear of the handheld power tool can be attained.

It is furthermore proposed that the handheld power tool device includes a gearbox with a bearing location for receiving a deformation element of the sensor unit. The term "bearing location" should be understood here to mean in particular a shape and/or disposition of at least a portion of an element and/or component, in particular a portion of the gearbox that is intended for at least partially receiving and/or surrounding a further component, so that degrees of freedom, in particular degrees of freedom of translation and/or rotation, of the component that is received and/or surrounded can be restricted. Advantageously, the deformation element is connected by screw connections to the bearing location of the gearbox. However, it is conceivable to connect the deformation element to the bearing location in some other way that appears appropriate to one skilled in the art. The term "deformation element" here defines in particular an element which makes it possible for a sensor element to detect a load acting on the element, such as a torque parameter, by means of a deformation in the external shape and/or dimension of the element, in particular an essentially elastic change in length. The deformation element is advantageously formed from aluminum. However, it is conceivable for the deformation element to be made from some other material that appears useful to one skilled in the art. By means of the bearing location, disposed on the gearbox, for receiving the deformation element, the handheld power tool device can be kept especially compact, and additional installation space can advantageously be saved for the bearing location.

Advantageously, the sensor unit has at least one deformation element on which at least one sensor element is disposed. Advantageously, the sensor element, in particular a strain gauge (SG), is solidly connected to the deformation element. The sensor element is preferably glued to the deformation element. However, it is conceivable to connect the sensor element to the deformation element in some other way that appears useful to one skilled in the art. The deformation element is preferably embodied as an deformable bar. Advantageously, a deformation and in particular a change in length of the deformation element can be detected. Moreover, such a disposition of the deformation element and the sensor element advantageously saves in terms of components, installation space, assembly effort, and costs.

It is furthermore proposed that the handheld power tool device includes a gear element and a transmission element that is operatively connected to the gear element for transmitting a torque parameter to a deformation element of the sensor unit. The term "torque parameter" should be understood here in particular to mean a parameter that characterizes a torque, such as in particular a length of a lever arm and/or especially preferably a force. Preferably, the transmission element is disposed directly in a gear of a handheld power tool. Moreover, the transmission element essentially surrounds the entire gear element in at least one direction. The transmission element is connected to the gear element in such a way that transmission of forces and/or torques can take place between the transmission element and the gear element. Preferably, the transmission element is connected to the gear element by means of a pressing operation and/or a welding operation and/or a toothing. However, it is also conceivable to connect the transmission element to the gear element in some other way that appears useful to one skilled in the art. By means of such an operative connection of the transmission element and the gear element, an advantageous torque detection, particularly in a handheld power tool, can be achieved. Furthermore, an advantageous and in particular space-saving disposition of the deformation element and/or of the sensor unit at least partly in a gear can be attained.

The transmission element furthermore has a radial extension, which is intended for transmitting at least one force to the deformation element. The radial extension is connected to the deformation element by means of a form- and/or force-locking connection. Advantageously, the radial extension is connected to the deformation element by means of a screw connection. However, it is conceivable to connect the radial extension to the deformation element in some other way that appears useful to one skilled in the art. Preferably, loads on the gear element are transmitted to the deformation element via the radial extension of the transmission element, whereupon the deformation element changes its shape and/or its dimension. An operative connection can be attained between the transmission element and the deformation element in a structurally simple way, so that an advantageous torque detection by means of the deformation element of the sensor unit can be attained.

Preferably, the gear element is embodied as a ring gear. The ring gear is provided in a gear, in particular a planetary gear, as a countersupport for further gear wheels, especially planet wheels, and the gear wheels roll on the ring gear and generate and/or transmit a torque. Thus torques can advantageously be detected in the immediate vicinity of the site where they occur.

It is also proposed that the transmission element is embodied essentially annularly. As a result, the gear element embodied as a ring gear can be surrounded, at least in a circumferential direction of the annular transmission element, essentially completely by the transmission element. An operative connection between the transmission element and the gear element can be achieved structurally simply.

It is furthermore proposed that the handheld power tool device has an electronic unit, which is provided for evaluating detected data from the at least one sensor unit. Preferably, the electronic unit surrounds at least one arithmetic unit which is intended for evaluating deformation parameters of the deformation element that have been ascertained and/or detected by the strain gauge (SG). In this connection, the term "arithmetic unit" should be understood in particular to mean a unit which may be formed by an evaluation unit and/or a control unit; the arithmetic unit may be formed either by a processor alone or in particular by a processor along with further electronic components, such as a memory device. If it is detected that a limit torque of a gear unit is exceeded, the electronic unit can at least reduce or interrupt a supply of electrical energy to an electric motor of the handheld power tool, so that torque transmission to a tool receptacle can be reduced and/or interrupted. By means of the handheld power tool device of the invention, components, in particular gear components of a handheld power tool, can advantageously be spared from stress.

The handheld power tool, in particular a cordless screwdriver, having a handheld power tool device according to the invention is furthermore proposed. Components contained in a gear of the handheld power tool can then advantageously be protected against major wear, and a long service life of the handheld power tool can be achieved.

BRIEF DESCRIPTION OF THE DRAWINGS

The invention will be better understood and further objects and advantages thereof will become more apparent from the ensuing detailed description of a preferred embodiment taken in conjunction with the drawings, in which.

DESCRIPTION OF THE PREFERRED EMBODIMENT

Figure 1:
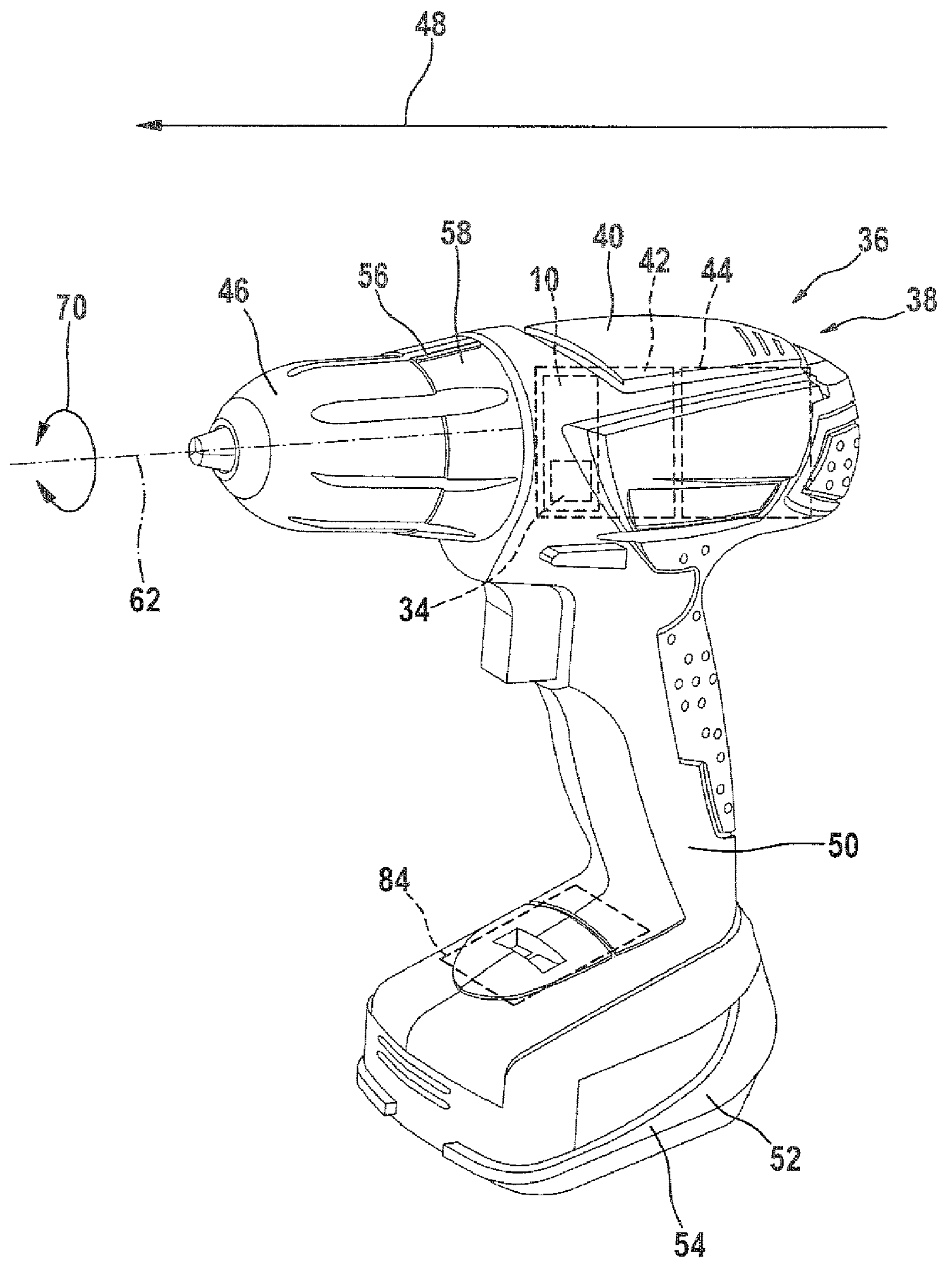
FIG. 1 shows a handheld power tool with a handheld power tool device according to the invention in a schematic illustration.

FIG. 1 shows a handheld power tool 38, embodied as a cordless screwdriver 36, with a handheld power tool device 10 of the invention in a schematic illustration. The cordless screwdriver 36 includes a multi-part housing 40, which surrounds the handheld power tool device 10, a gear unit 42, and a motor unit 44 of the cordless screwdriver 36. The cordless screwdriver 36 furthermore includes a tool receptacle 46, into which a tool (not shown in further detail here) can be inserted. A main extension direction 48 of the cordless screwdriver 36 extends from the motor unit 44 in the direction of the tool receptacle 46. A main handle 50, which is intended for guidance of the cordless screwdriver 36 by a user, is disposed on the housing 40, essentially perpendicular to the main extension direction 48. The main handle 50 is embodied in one piece with the housing 40. A battery unit 54 embodied as a rechargeable battery pack 52 is secured by a decent connection to the main handle 50 and connected electrically to the cordless screwdriver 36, in particular to the motor unit 44.

The cordless screwdriver 36 furthermore includes an input unit 56, by means of which a limit torque that is the most that can be transmitted during operation of the cordless screwdriver 36 can be set by the user. The input unit 56 is connected electronically to the handheld power tool device 10. In this exemplary embodiment, the input unit 56 is embodied as a manual adjusting ring 58. However, it is conceivable to embody the input unit 56 in some other way that appears useful to one skilled in the art, for instance as an electronic input unit with keys and/or with a rotary regulator. For instance, the limit torque can make a screw-in depth, as desired by a user, of a screw into a work piece possible during operation of the cordless screwdriver 36. To that end, torques generated during the operation of the cordless screwdriver 36 are detected. As soon as the detected torque exceeds the limit torque set by the user, transmission of the torque is discontinued.

Figure 2:
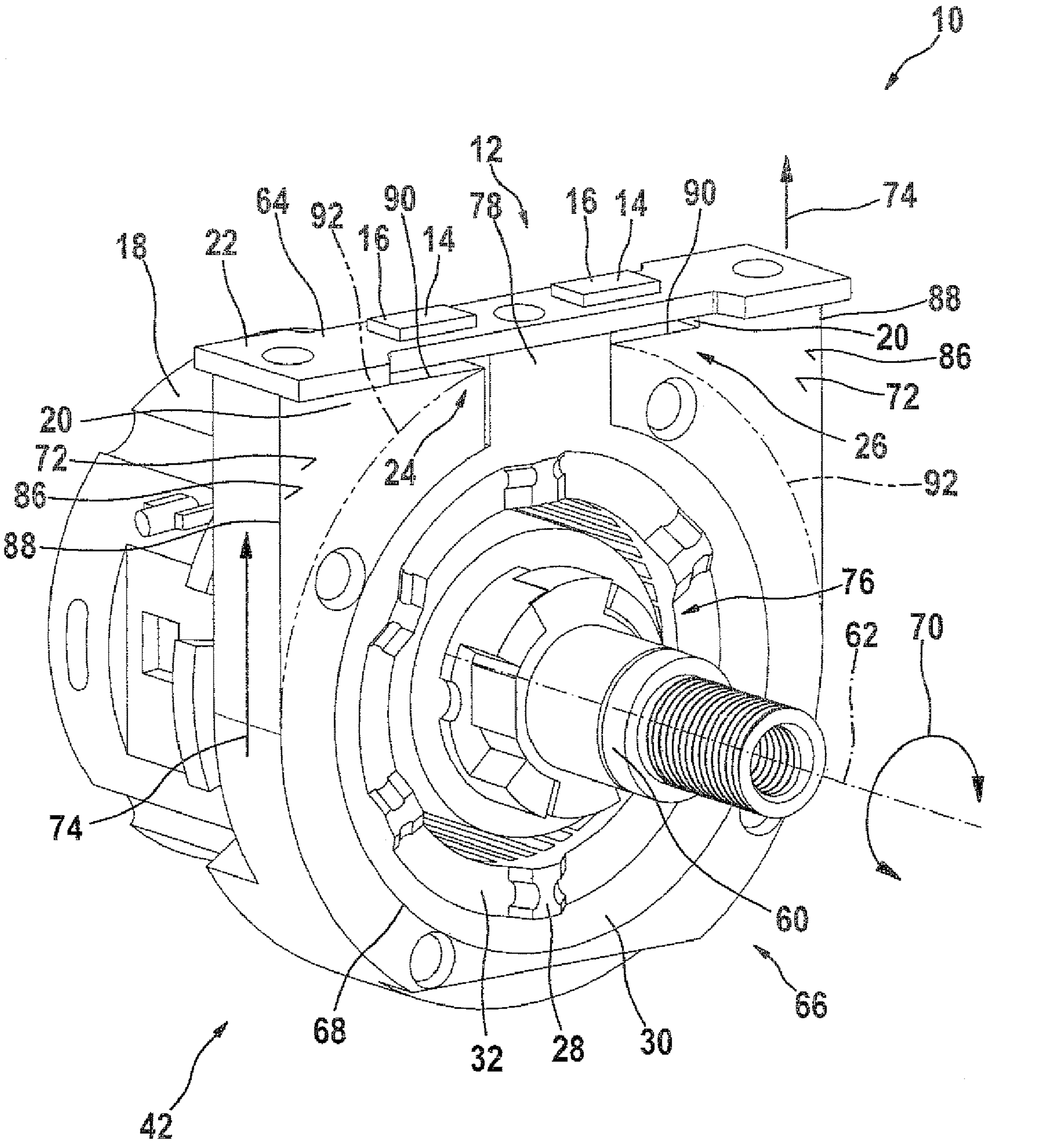
FIG. 2 show the handheld power tool device of the invention in a partly opened gearbox in a schematic illustration.

FIG. 2 shows the handheld power tool device 10 of the invention in a partly opened gearbox 18 in a schematic illustration. The handheld power tool device 10 is intended for detecting the torque. To that end, the handheld power tool device 10 includes a sensor unit 12, which is intended for detecting a deformation parameter. In principle, an embodiment of the handheld power tool device 10 with more than one sensor unit is conceivable at any time in an alternative embodiment. In operation of the cordless screwdriver 36, the torque is generated by means of the motor unit 44 and transmitted to the tool receptacle 46 via the gear unit 42 and a gear output shaft 60. The tool receptacle 46 transmits the torque generated to the tool, which on the basis of the torque executes a rotary motion about the axis 62 of rotation of the gear output shaft 60. Corresponding reaction forces and/or reaction torques are transmitted to components of the gear unit 42 which deform slightly, essentially elastically, in response to the reaction forces and/or reaction torques, yet continue to assure the functioning of the cordless screwdriver 36.

In operation of the cordless screwdriver 36, there is a relationship between a magnitude and/or type of deformation and the torque that causes the deformation. This relationship makes it possible to associate the torque with a deformation parameter, such as a change in length, and on the basis of the change in length to ascertain and/or detect an instantaneously operative torque corresponding to the change in length. To that end, the sensor unit 12 has two sensor elements 14, whose electrical resistances are dependent on a deformation. The two sensor elements 14 of the sensor unit 12 are embodied as strain gauges (SGs) 16, so that even slight deformations can be detected.

Moreover, the sensor unit 12 has a deformation element 22, on which the two strain gauges (SGs) 16 are disposed. The deformation element 22 is embodied as an expandable or deformable bar 64. The two strain gauges (SGs) 16 are connected to the deformable bar 64 by an adhesive bond. However, it is conceivable to connect the strain gauges (SGs) 16 in some other way that appears useful to one skilled in the art. Depending on the field in which the handheld power tool device 10 of the invention is employed, it may be advantageous to dispose more than two strain gauges (SGs) 16 on the deformable bar 64, so that a useful detection of deformations, in particular of changes in length, of the deformable bar 64 can be achieved.

The gear unit 42, embodied as a planetary gear 66, of the cordless screwdriver 36 is disposed in the gearbox 18, which is surrounded by the handheld power tool device 10. The gearbox 18 is embodied essentially cylindrically, and a circular recess 68 extends through the gearbox 18 along the axis 62 of rotation. The planetary gear 66 is disposed in this circular recess 68. The gearbox 18 here surrounds the planetary gear 66 in a direction 70 of rotation of the gear output shaft 60. However, it is conceivable to embody the gearbox 18 in some other form that appears useful to one skilled in the art, so that the handheld power tool device 10 of the invention is unrestricted in its function.

Figure 3:
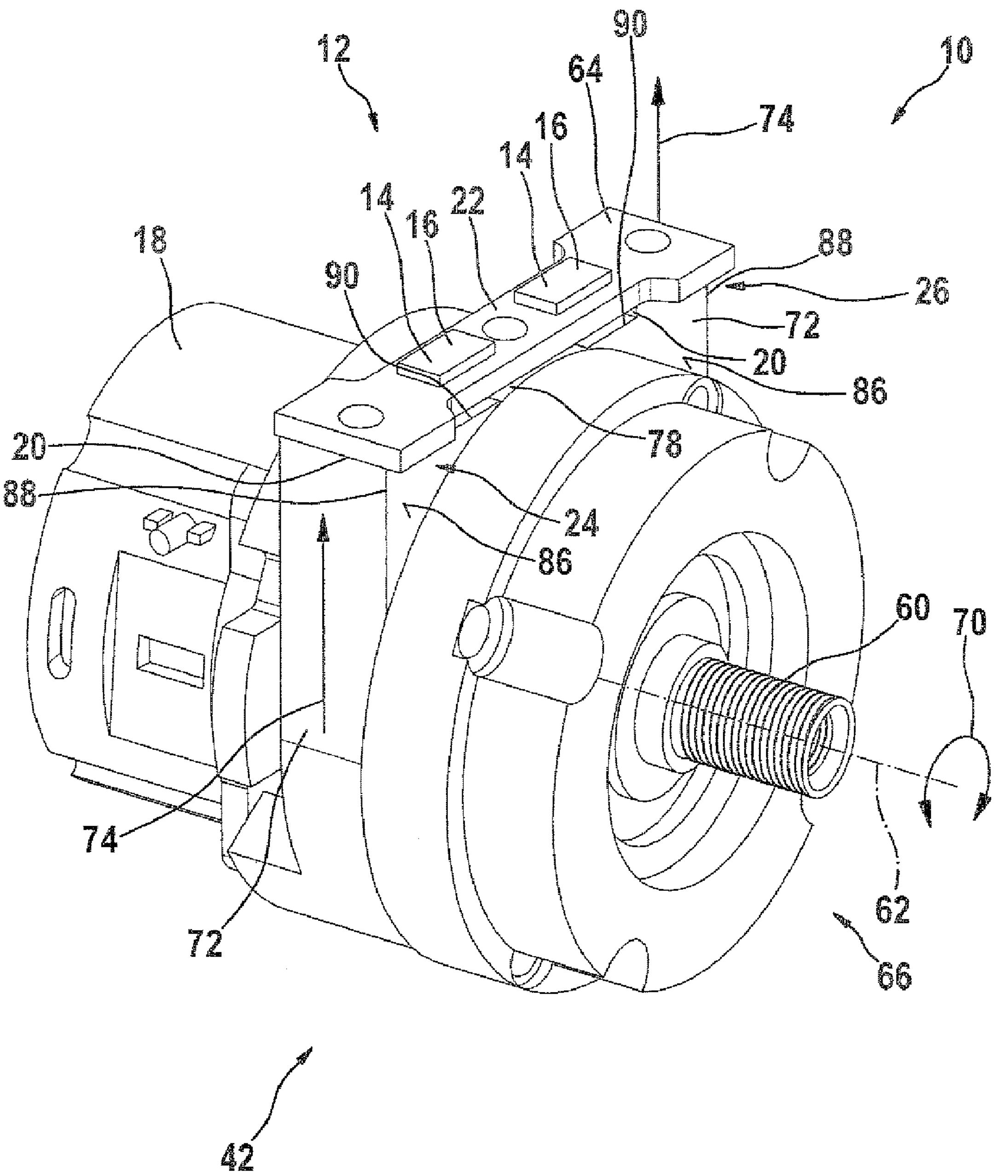
FIG. 3 shows the handheld power tool device of the invention in the closed gearbox in a schematic illustration.

The gearbox 18 furthermore has a bearing location 20 for receiving the deformable bar 64 of the sensor unit 12. The bearing location 20 is formed at least in part by two extensions 72 of the gearbox 18. However, it is conceivable to provide more than two extensions 72 on the gearbox 18. The extensions 72 each have a cross-sectional face 86 that extends perpendicular to the axis 62 of rotation. The cross-sectional face 86 is defined by a first and a second side 88, 90, which are disposed perpendicular to one another, and a partial arc 92, and end regions, facing away from one another, of the two sides are joined by means of the partial arc 92. The first and second sides 88, 90 form an outer side of the gearbox 18. Moreover, the first sides 88 of the cross-sectional faces 86 of the extensions 72 are disposed parallel to one another on opposed sides of the gearbox 18. The opposed first sides 88 of the cross-sectional faces 86 each extend parallel to a tangential direction 74 of the cylindrical gearbox 18. The bearing location 20 extends essentially perpendicular to the axis 62 of rotation of the gear output shaft 60 and essentially perpendicular to the first sides 88 of the cross-sectional face 86 of the extensions 72. The bearing location 20 has two portions 24, 26, which are spaced apart from one another spatially by means of a recess along an extent of the second side 90 of the cross-sectional face 86. The recess extends essentially perpendicular to the axis 62 of rotation and parallel to each of the first sides 88 of the cross-sectional faces 86 (FIGS. 2 and 3).

However, it is conceivable to dispose the bearing location 20 in recesses in the extensions 72, so that then the bearing location 20 would be disposed inside a maximum dimension of the cylindrical gearbox 18. In addition, the recesses may extend essentially perpendicular to the axis 62 of rotation of the gear output shaft 60 and essentially perpendicular to both extensions 72. The recesses could be embodied such that at least one peripheral region of the deformable bar 64 is received (not shown here in further detail) in each corresponding recess.

The deformable bar 64 is disposed outside the maximum dimension, in particular a maximum radial dimension, of the cylindrical gearbox 18 on the outer side of the gearbox 18 and is connected to the bearing location 20 by means of two screws (not shown in detail here). The deformable bar 64 here is connected to each of the portions 24, 26 by a respective screw. The maximum dimension of the gearbox 18 extends essentially perpendicular to the axis 62 of rotation of the gear output shaft 60. The handheld power tool device 10 furthermore includes a gear element 28 and a transmission element 30, which is operatively connected to the gear element 28 for transmitting the torque parameter to the deformable bar 64 of the sensor unit 12. The gear element 28 is embodied as a ring gear 32. The transmission element 30 is embodied essentially annularly and surrounds the ring gear 32 in the direction 70 of rotation of the gear output shaft 60. Moreover, the transmission element 30 is connected solidly to the ring gear 32 by a pressing process. However, it is conceivable to connect the transmission element 30 to the ring gear 32 in some other way that appears useful to one skilled in the art, such as by means of a toothing. In an alternative embodiment of the handheld power tool device 10, however, it is conceivable to embody the transmission element 30 in one piece with the ring gear 32, so that the ring gear 32 would be operatively connected directly to the deformable bar 64.

In an inner region 76 of the ring gear 32, a plurality of planet wheels (not shown in detail here) roll and thus drive the gear output shaft 60 by means of a torque that is generated. The mode of operation of the planetary gear 66 is equivalent to a mode of operation already known to one skilled in the art. On the principle of "action=reaction", the torques generated in the planetary gear 66 generate reaction forces and/or reaction torques at the ring gear 32. By means of the operative connection between the transmission element 30 and the ring gear 32, these reaction forces and/or reaction torques can be transmitted by the ring gear 32 to the transmission element 30. The transmission element 30 and the ring gear 32 are moved in the direction 70 of rotation in the gearbox 18 by the reaction forces and/or reaction torques. The reaction forces and/or the reaction torques generate the torque parameter, which is formed by a parameter of a force, and the force is transmitted by the transmission element 30 to the deformable bar 64. The torque parameter, in particular the force generated by the reaction forces and/or reaction torques, acts essentially parallel to an increase in length of the deformable bar 64 that results from an exertion of force.

For transmitting the torque parameter, in particular the force, to the deformable bar 64, the transmission element 30 has a radial extension 78, which extends essentially parallel to the two extensions 72 of the gearbox 18 and essentially parallel to a radial direction of the annular transmission element 30. The radial extension 78 here is embodied in one piece with the transmission element 30. The radial extension 78 is connected to the deformable bar 64 by means of a screw connection (not shown in detail here). The radial extension 78 is furthermore disposed spatially with play between the two portions 24, 26 of the bearing location 20, so that the radial extension 78 has a freedom of motion in the direction 70 of rotation between the portions 24, 26. The freedom of motion is limited essentially by the recess between the portions 24, 26, a width of the radial extension 78, and the screw connection between the radial extension 78 and the deformable bar 64. The width of the radial extension 78 extends essentially parallel to the second sides 90 of the cross-sectional faces 86 of the extensions 72.

By means of a motion of the transmission element 30 and the ring gear 32 in the direction 70 of rotation that is engendered by the reaction forces and/or reaction torques, the radial extension 78 is moved, likewise in the direction 70 of rotation. By means of the screw connection between the radial extension 78 and the deformable bar 64, this creates a flow of force between the radial extension 78 and the deformable bar 64. The deformable bar 64 is elongated and/or compressed as a result of the force transmitted by the flow of force. The transmitted force thus forms the torque parameter, which causes a deformation, embodied as a change in length, of the deformable bar 64. This change in length is detected as a deformation parameter of the deformable bar 64 by means of the two strain gauges (SGs) 16. The resistance of the two strain gauges (SGs) 16 varies as a function of the change in length of the deformable bar 64.

Figure 4:
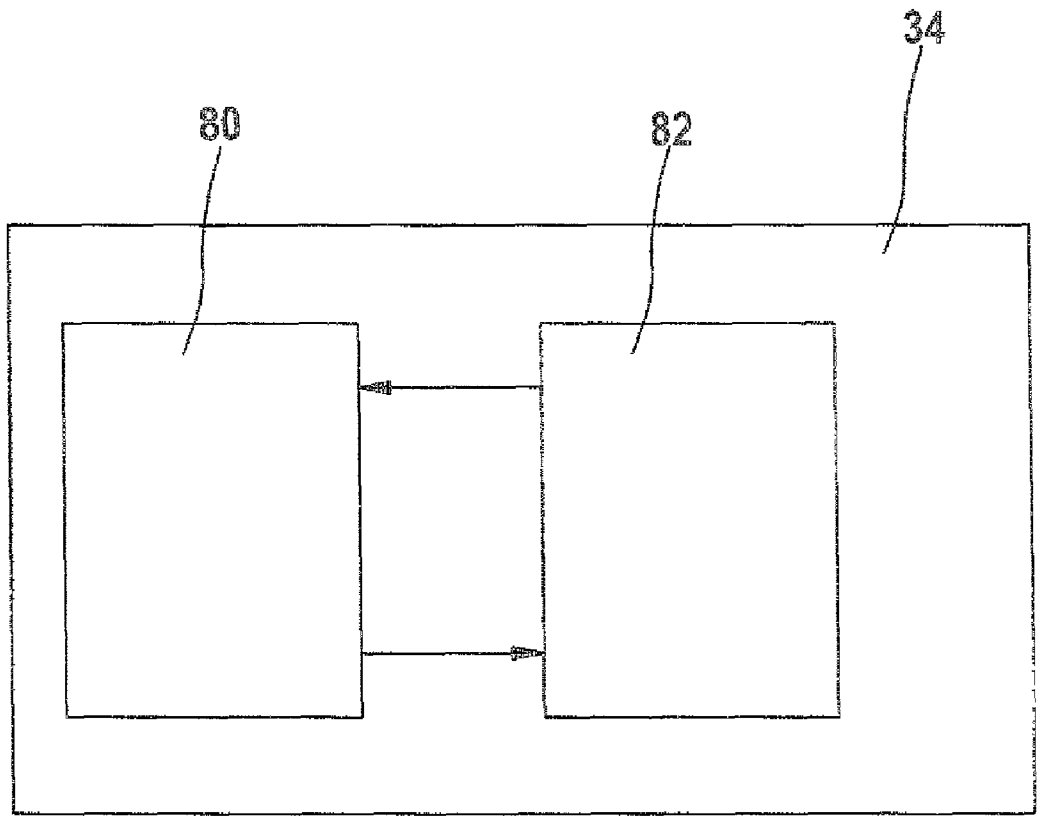
FIG. 4 shows an electronic unit of the handheld power tool device of the invention in a schematic illustration.

The handheld power tool device 10 furthermore includes an electronic unit 34 (FIGS. 1 and 4), which is intended for evaluating data detected from the sensor unit 12. In operation of the handheld power tool 38, the electronic unit 34 evaluates the change in length of the deformable bar 64 that is detected by means of the two strain gauges (SGs) 16. To that end, by means of an arithmetic unit 80 of the electronic unit 34, the change in resistance of the two strain gauges (SGs) 16 is evaluated and, on the basis of a comparison value, associated with a corresponding torque. The comparison values are stored or memorized in a memory means 82 of the electronic unit 34, to which the arithmetic unit 80 has permanent access during the operation of the cordless screwdriver 36, so that a detected torque is compared continuously with the comparison values stored in memory The electronic unit 34 of the handheld power tool device 10 is connected electronically to a control unit 84 (FIG. 1) of the cordless screwdriver 36, so that between the electronic unit 34 and the control unit 84, an exchange of data and/or commands can take place. If on the basis of the evaluation a torque is ascertained which exceeds the limit torque set by the user, then by means of the exchange of data and/or commands, a supply of current to the motor unit 44 during the operation of the cordless screwdriver 36 is interrupted automatically by the control unit 84, so that a transmission of a torque is likewise interrupted and/or reduced.

The foregoing relates to a preferred exemplary embodiment of the invention, it being understood that other variants and embodiments thereof are possible within the spirit and scope of the invention, the latter being defined by the appended claims.

We claim:

1. A handheld power tool device which detects a torque, having;

at least one sensor unit which detects a deformation parameter, the sensor unit having at least one deformation element;

a gearbox having a bearing location which receives the deformation element of the sensor unit, wherein the bearing location has at least two portions formed at least in part by two extensions of the gearbox which are spaced apart from one another spatially and wherein each of the at least two portions is connected to the deformation element, and a gear element and a transmission element disposed in the gearbox, which transmission element transmits a torque parameter to the deformation element of the sensor unit and is operatively connected to the gear element, the transmission element having a radial extension embodied in one piece with the transmission element and extending essentially parallel to and disposed in between the two extensions of the gearbox, which radial extension transmits at least one force to the deformation element by a connection therebetween, wherein the deformation element is disposed lengthwise on the out side of the gearbox spanning across a maximum radial dimension of the gearbox in a direction perpendicular to an axis of rotation of an output shaft of the gearbox.

2. The handheld power tool device as defined by claim 1, wherein the sensor unit has at least one sensor element, whose electrical resistance is dependent on a deformation.

3. The handheld power tool device as defined by claim 1, wherein the sensor unit has at least one sensor element that is embodied as a strain gauge.

4. The handheld power tool device as defined by claim 2, wherein the sensor unit has at least one sensor element that is embodied as a strain gauge.

5. The handheld power tool device as defined by claim 1, wherein the at least one deformation element has the at least one sensor element disposed thereon.

6. The handheld power tool device as defined by claim 2, wherein the at least one deformation element has the at least one sensor element disposed thereon.

7. The handheld power tool device as defined by claim 1, wherein the gear element is embodied as a ring gear.

8. The handheld power tool device as defined by claim 1, wherein the transmission element is embodied essentially annularly.

9. The handheld power tool device as defined by claim 1, further having an electronic unit, which evaluates detected data from the at least one sensor unit.

10. The handheld power tool device as defined by claim 6, further having an electronic unit, which evaluates detected data from the at least one sensor unit.

11. A handheld power tool, in particular a cordless screwdriver, having a handheld power tool device as defined by claim 1.

12. The hand-held power tool device as recited claim 3, wherein the at least one strain gauge is disposed on the deformation element.

13. The hand-held power tool device as recited in claim 1, wherein the gearbox is embodied essentially cylindrically, and a circular recess extends through the gearbox.

14. The hand-held power tool device as recited in claim 1, wherein the two extensions each have a cross-sectional face extending perpendicular to an axis of rotation.

15. The hand-held power tool device as recited in claim 14, wherein the cross-sectional face is defined by a first side and a second side which are disposed perpendicular to one another.

16. The hand-held power tool device as recited in claim 15, wherein a third side of the cross-sectional face is shaped as a partial arc.

17. The hand-held power tool device as recited in claim 1, wherein the transmission element is embodied essentially annularly and surrounds the gear element.

18. The hand-held power tool device as recited in claim 1, wherein the transmission element is connected solidly to the gear element by a pressing process.

* * * * *